United States Patent [19]
Grose

[11] 4,284,107
[45] Aug. 18, 1981

[54] FRACTURE ARRESTOR FOR A PIPELINE

[75] Inventor: Ronald D. Grose, Omaha, Nebr.

[73] Assignee: Internorth, Omaha, Nebr.

[21] Appl. No.: 143,646

[22] Filed: Apr. 25, 1980

[51] Int. Cl.³ .......................... F16L 9/14; F16L 35/00
[52] U.S. Cl. ..................................... 138/172; 138/155
[58] Field of Search ............... 138/172, 155, 178, 177

[56] References Cited
U.S. PATENT DOCUMENTS

| 3,080,179 | 3/1963 | Huntsinger | 138/155 |
| 3,349,807 | 10/1967 | Penman | 138/172 |
| 4,180,104 | 12/1979 | Park et al. | 138/172 |
| 4,195,669 | 4/1980 | Ives et al. | 138/172 |

FOREIGN PATENT DOCUMENTS 2026128  1/1980  United Kingdom .................... 138/172

Primary Examiner—Willis Little

Attorney, Agent, or Firm—Zarley, McKee, Thomte, Voorhees & Sease

[57] ABSTRACT

A fracture or crack arrestor assembly is described for insertion into a pipeline formed of a plurality of sections to prevent the propagation of fractures in the pipeline. The crack arrestor assembly includes a body portion which is generally cylindrical in shape and which has opposite ends in open communication with the pipeline. The body portion includes wall portions which are sloped inwardly from each end thereof to an intermediate wall portion which forms a reduced diameter at the outer surface of the body portion. A cylindrical reinforcing member embraces the reduced diameter portion of the body portion. A cylindrical cover or shield is secured to and embraces the body portion and has approximately the same outside diameter as the pipeline to facilitate wrapping or coating of the pipeline. The cavity between the interior of the cover and the body portion may be filled with a suitable filler material.

12 Claims, 5 Drawing Figures

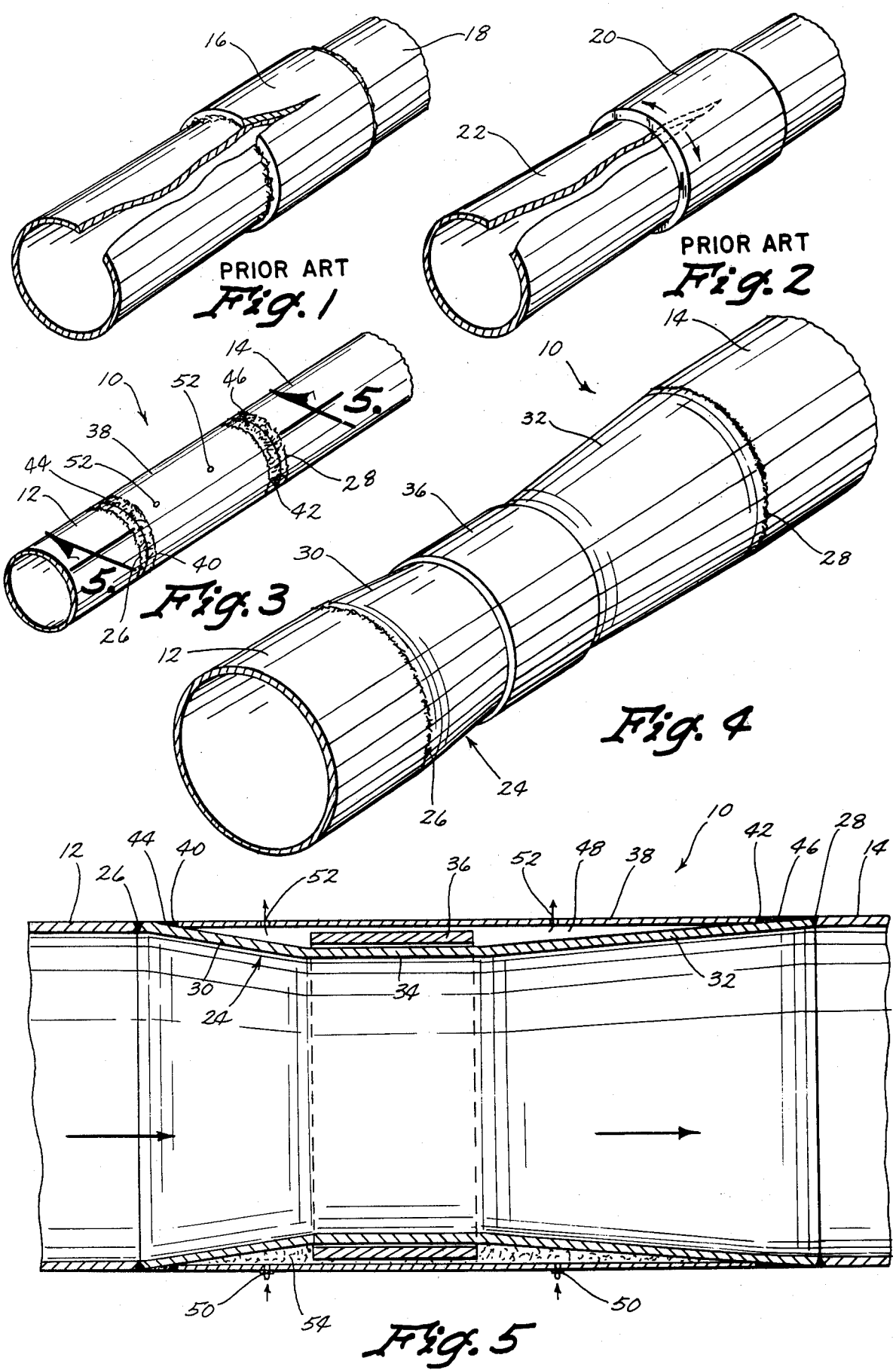

FRACTURE ARRESTOR FOR A PIPELINE

BACKGROUND OF THE INVENTION

The methods of arresting fractures in high pressure pneumatic pipelines have been the subject of numerous patents. Typical of such types of patents are U.S. Pat. Nos. 3,096,105; 3,349,807; 3,698,747; 3,768,269; 3,860,039; 3,870,350; 3,990,478; 4,144,125; and 4,148,127.

The control of ductile fractures in pipelines in pneumatic service represents a serious problem. This is also true in those pipelines being used to transport fluids which have a significant vapor phase or which contain significant amounts of dissolved gases. The control of fracture propagation through mechanical reinforcements have been described in many of the above-identified prior art patents. Essentially, fractures propagate in the pipeline due to the gas dynamic forces on the pipe which produce stress at the top of the progressing crack which exceed the ultimate strength of the material at that point. By simply strengthening the material at a given point such that the stresses are reduced well below the material ultimate strength, the crack is prevented from progressing. As shown in certain of the patents, such a reinforcement usually takes the form of a band of multiple bands or rope around the circumference of the pipe.

It has been found that a structural independent reinforcing member is preferable. That is, a reinforcement that is either an integral part of the pipe (thick section reinforcement) or a welded-on-member is not as desirable as a structurally independent member as a consequence of stress concentration occurring at the crack tip. An integral member is subjected to crack stress intensification at the crack tip with the crack being able to progress through the reinforcement. When the reinforcing member is not integral, the stress is more uniformly distributed through the reinforcement and greater forces are able to be resisted. This situation is depicted in FIGS. 1 and 2 of the patent drawings which illustrate welded and non-welded sleeves respectively.

FIG. 1 of the patent drawings illustrates the manner in which the weld in a welded-on-seeve arrestor serves as a communicative path for the crack to initiate in the sleeve. The resultant stress intensification at the crack tip greatly reduces the effectiveness of the additional material of the sleeve. In contrast, the crack passes under the sleeve in the non-welded situation as illustrated in FIG. 2 of the patent drawings. The sleeve in FIG. 2 is stretched as shown by the arrows with the resultant stresses uniformly distributed in the body of the sleeve.

While the loose sleeve such as illustrated in FIG. 2 has certain performance advantages, the fact that the gap between the pipeline and the sleeve is in open communication with the environment poses problems with structural integrity of both the pipeline and the arrestor. Crevice corrosion must be avoided at all cost and the cost and construction problems associated with providing such protection are substantial negative features of this particular approach to fracture control. For example, the existence of a sleeve such as illustrated in FIG. 2 poses unresolved difficulties for over-the-ditch pipe coating machines. For certain sleeve designs, the pipe coating machine must be removed from the pipeline, reinstalled, recalibrated, etc. For closely spaced arrestors, the problems enumerated above would preclude over-the-ditch line coating which is normally the least expensive method of pipe coating.

Other types of crack or fracture arrestors are shown in the prior art but the arrestors substantially reduce the interior diameters of the pipeline which serve as an obstruction to pipeline pigs and an obstruction to unimpeded flow of the gases therethrough which creates pressure differentials or drops.

Therefore, it is a principal object of the invention to provide an improved fracture arrestor.

A further object of the invention is to provide a crack arrestor for pipelines which permits conventional pipeline pigs to pass therethrough.

A further object of the invention is to provide a crack arrestor for pipelines wherein the crack arrestor has a diameter substantially the same as the pipeline to permit conventional over-the-ditch coating machines to be used on the pipeline.

A further object of the invention is to provide a crack arrestor including means for preventing crevice corrosion.

A still further object of the invention is to provide a crack arrestor for a pipeline which may be easily installed in conventional pipelines.

A still further object of the invention is to provide a crack arrestor which is economical of manufacture.

These and other objects will be apparent to those skilled in the art.

BRIEF DESCRIPTION OF THE DRAWINGS

FIG. 1 is a partial perspective view illustrating a type of prior art crack arrestor wherein a sleeve is welded to the pipeline:

FIG. 2 is a partial perspective view of another prior art crack arrestor wherein a sleeve embraces the pipeline:

FIG. 3 is a partial perspective view of the crack arrestor of this invention mounted in a pipeline:

FIG. 4 is a perspective view of the crack arrestor of this invention with the cylindrical cover removed therefrom; and FIG. 5 is an enlarged sectional view seen on lines 5—5 of FIG. 3 with the arrows indicating flow direction.

SUMMARY OF THE INVENTION

A fracture arrestor assembly is described which is adapted to be positioned between the ends of a pair of pipes in a pipeline. The crack arrestor assembly includes a body portion which is substantially cylindrical in shape and which has a pair of open ends in communication with the pipe sections at either end thereof. The body portion includes wall portions which slope inwardly from the ends thereof to an intermediate wall portion thereby defining a reduced diameter portion. A cylindrical reinforcing means preferably loosely embraces the reduced diameter portion between the sloped wall portions. A cylindrical cover is secured to and embraces the body portions between the ends thereof so that the diameter of the crack arrestor assembly is substantially the same as that of the pipeline. The interior of the cover may be filled with a suitable filling material if desired.

DESCRIPTION OF THE PREFERRED EMBODIMENT

The crack arrestor assembly of this invention is referred to generally by the reference numeral 10. The crack arrestor assembly is designed to be inserted between a pair of pipe sections 12 and 14 which form a conventional pipeline. FIG. 1 illustrates a type of prior art crack arrestor wherein a sleeve 16 is welded to the pipeline 18. FIG. 2 illustrates another type of prior art crack arrestor wherein a sleeve 20 embraces the pipeline 22.

The crack arrestor 10 generally includes a cylindrical shaped body portion 24 which is comprised of material identical to the pipeline itself. The body portion 24 is joined in line to the pipeline by conventional means such as welds 26 and 28. Body portion 24 is contoured by appropriate means to form a relatively short frusto-conical converging section 30 and a relatively long diverging frusto-conical section 32. Positioned between the frusto-conical sections 30 and 32 is a constant radius section 34 defining a reduced diameter portion. Reduced diameter portion 34 preferably has an outside diameter less than the inside diameter of the pipe sections 12 and 14.

The numeral 36 refers to a cylindrical reinforcing member or sleeve which preferably loosely embraces the reduced diameter portion 34 as best seen in FIG. 5. Although it is preferred that member 36 be of the sleeve or ring type, other types of construction may be possible provided sufficient cross-section area is provided. Although the loose sleeve is the most economical apparatus to employ, wrapped cable or steel bands could also be used. The frusto-conical shaped section 30 is sloped gradually at an angle preferably not greater than 20° to facilitate the passage of cleaning equipment (pigs) and inspection equipment. The divergent portion 32 is sloped at an angle not to exceed approximately 8° to prevent flow separation from occurring with consequential pressure losses. All transition corners should have a large radius to provide a smooth geometrical fairing.

Preferably, a cylindrical sheet metal cover 38 is secured to the body portion 24 at 40 and 42 by welding or the like so that the crack arrestor assembly has a geometry or an outside diameter substantially equal to that of the pipeline itself. The constant diameter created by the cover 38 simplifies the application of protective coatings to the pipeline especially if automated equipment is used for over-the-ditch coating. The gaps 44 and 46 formed between the ends of the cover 38 and the body portion 24 may be suitably filled with a material such as plastic to further enhance the constant diameter feature as well as appearance. Cover 38 defines a cavity or compartment area 48 between it and the exterior surface of the body portion 24 which is preferably filled with a hardenable material to structurally support the sheet metal cover 38. The filler material may be injected into the cavity 48 through removable or resealable fittings 50 located near the bottom of the assembly. Preferably, cover 38 is provided with openings 52 at the upper portion thereof to permit air to pass outwardly from compartment 48 as the material 54 is injected into the cavity or compartment 48 through the fittings 50.

Thus, if a fracture should occur in section 12, the fracture will continue into the body portion 24 until the crack is formed in reduced diameter portion 34. The formation of a crack in the reduced diameter portion 34 causes the outward expansion of the reduced diameter portion 34 so that engagement between reduced diameter postion 34 and the sleeve 36 is achieved as in prior art devices. The sleeve 36 arrests the crack and prevents the crack from spreading to the wall portion 32 or the section 14. It should be noted that the direction of fracture could be "upstream" or opposite to that just described. In such a case, the sleeve 36 arrests the crack and prevents the crack from spreading to the wall portion 30 or the section 12.

Thus it can be seen that a novel crack arrestor assembly has been described for a pipeline which has substantially the same outside diameter as the pipeline itself thereby permitting economical coating of the pipeline with conventional coating material. The interior configuration of the crack arrestor assembly is such that no interference is provided to the passage of conventional pigging or inspection equipment being passed through the pipeline.

Thus it can be seen that the crack arrestor of the invention accomplishes at least all of its stated objectives.

I claim:

1. A crack arrestor assembly for insertion in at least one intermediate point in a pipeline formed of a plurality of sections of pipe to prevent the propagation of pipeline fractures, said crack arrestor assembly including a body portion having opposite ends which are in open communication with sections of said pipeline at both ends of said crack arrestor, said body portion including a wall which is sloped inwardly from each end thereof to an intermediate point thereby forming a reduced diameter portion at the outer surface of said body portion, and a reinforcing means embracing said reduced diameter portion.

2. The crack arrestor assembly of claim 1 wherein the outside diameter of said reinforcing means is less than the outside diameter of the pipeline.

3. The crack arrestor assembly of claim 2 wherein a cylindrical cover member is secured to and embraces said body portion between the ends thereof.

4. The crack arrestor assembly of claim 3 wherein said cylindrical cover member has an outside diameter substantially equal to the outside diameter of said pipeline.

5. The crack arrestor assembly of claim 4 wherein the inside diameter of said cylindrical cover member is greater than the outside diameter of said reinforcing means.

6. The crack arrestor assembly of claim 5 wherein said cylindrical cover member and said body portion define a cavity therebetween, and a filler material in said cavity.

7. The crack arrestor assembly of claim 1 wherein said reinforcing means comprises a sleeve.

8. The crack arrestor assembly of claim 1 wherein said reinforcing means comprises a band means.

9. The crack arrestor assembly of claim 1 wherein said reinforcing means comprises a cable means wrapped around said reduced diameter portion.

10. The crack arrestor assembly of claim 1 wherein said reinforcing means comprises a sleeve loosely embracing said reduced diameter portion.

11. The crack arrestor assembly of claim 1 wherein the wall at the upstream end of said body portion slopes inwardly at approximately a 20 degree angle.

12. The crack arrestor assembly of claim 1 wherein the wall at the downstream end of said body portion slopes outwardly at approximately an 8 degree angle.

* * * * *